(12) United States Patent
Voigt et al.

(10) Patent No.: US 12,117,322 B2
(45) Date of Patent: Oct. 15, 2024

(54) MAGNETIC-INDUCTIVE FLOWMETER

(71) Applicant: Endress+Hauser Flowtec AG, Reinach (CH)

(72) Inventors: Frank Voigt, Weil am Rhein (DE); Steffen Ziegler, Schopfheim (DE)

(73) Assignee: Endress+Hauser Flowtec AG, Reinach (CH)

( * ) Notice: Subject to any disclaimer, the term of this patent is extended or adjusted under 35 U.S.C. 154(b) by 344 days.

(21) Appl. No.: 17/754,160

(22) PCT Filed: Aug. 20, 2020

(86) PCT No.: PCT/EP2020/073415
§ 371 (c)(1),
(2) Date: Mar. 25, 2022

(87) PCT Pub. No.: WO2021/058209
PCT Pub. Date: Apr. 1, 2021

(65) Prior Publication Data
US 2022/0291025 A1 Sep. 15, 2022

(30) Foreign Application Priority Data
Sep. 26, 2019 (DE) ......................... 102019126013.2

(51) Int. Cl.
*G01F 1/58* (2006.01)
*G01F 15/14* (2006.01)
(52) U.S. Cl.
CPC .............. *G01F 1/588* (2013.01); *G01F 1/584* (2013.01); *G01F 15/14* (2013.01)

(58) Field of Classification Search
CPC ........... G01F 1/588; G01F 1/584; G01F 15/14
See application file for complete search history.

(56) References Cited

U.S. PATENT DOCUMENTS

| 3,945,250 A | 3/1976 | Elazar et al. |
| 5,325,728 A | 7/1994 | Zimmerman et al. |
| 2014/0157910 A1* | 6/2014 | Voigt ...................... G01F 1/586 73/861.11 |

(Continued)

FOREIGN PATENT DOCUMENTS

| DE | 1303740 B | 10/1972 |
| DE | 102007004826 A1 | 8/2008 |

(Continued)

*Primary Examiner* — Peter J Macchiarolo
*Assistant Examiner* — John M Royston
(74) *Attorney, Agent, or Firm* — Christopher R. Powers; Endress+Hauser (USA) Holding, Inc.

(57) ABSTRACT

A magnetic-inductive flowmeter includes: a housing having first and second housing parts connected via a guide element, which is configured to enable a distance between the first and second housing parts to be linearly adjustable; an exchangeable measurement tube for guiding a flowable medium; two measurement electrodes mounted in the measurement tube; a magnetic field-generating device for generating a magnetic field permeating the measurement tube; and at least two connection contacts, each electrically connected to a measurement circuit, wherein the measurement tube is reversibly interlockingly and/or frictionally arranged between the first housing part and the second housing part of the housing.

29 Claims, 5 Drawing Sheets

(56) References Cited

U.S. PATENT DOCUMENTS

| | | | | |
|---|---|---|---|---|
| 2015/0168188 A1* | 6/2015 | Reichart | ............... | G01F 1/584 |
| | | | | 73/861.12 |
| 2018/0209828 A1* | 7/2018 | Voigt | ................ | G01F 25/10 |

FOREIGN PATENT DOCUMENTS

| | | |
|---|---|---|
| DE | 102010031433 A1 | 1/2012 |
| DE | 102011079352 A1 | 1/2013 |
| DE | 202014103426 U1 | 8/2014 |
| DE | 102016118064 A1 | 3/2018 |
| EP | 688531 A1 | 12/1995 |
| GB | 2169079 A | 7/1986 |
| JP | 2006317224 B2 | 11/2006 |

\* cited by examiner

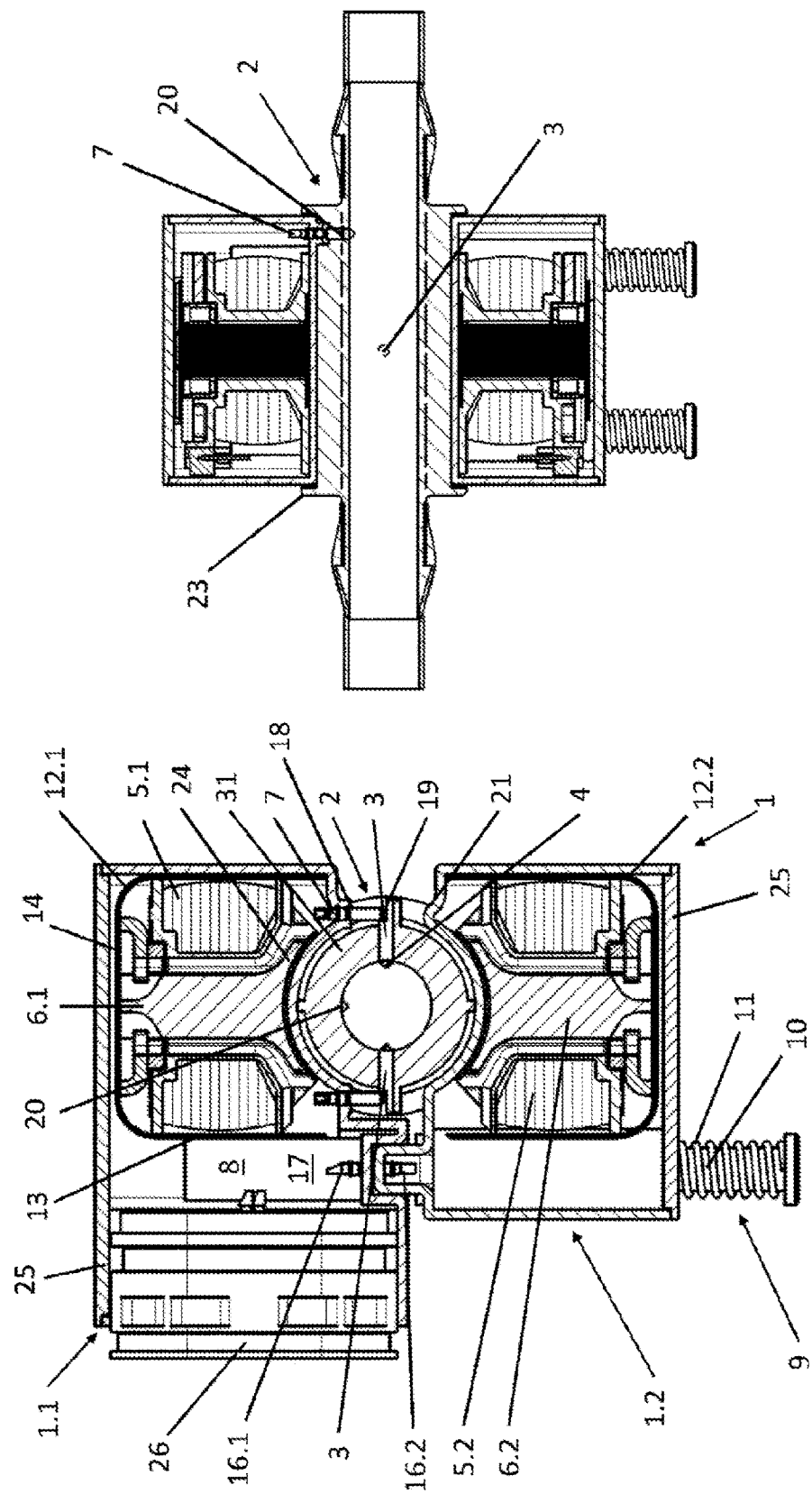

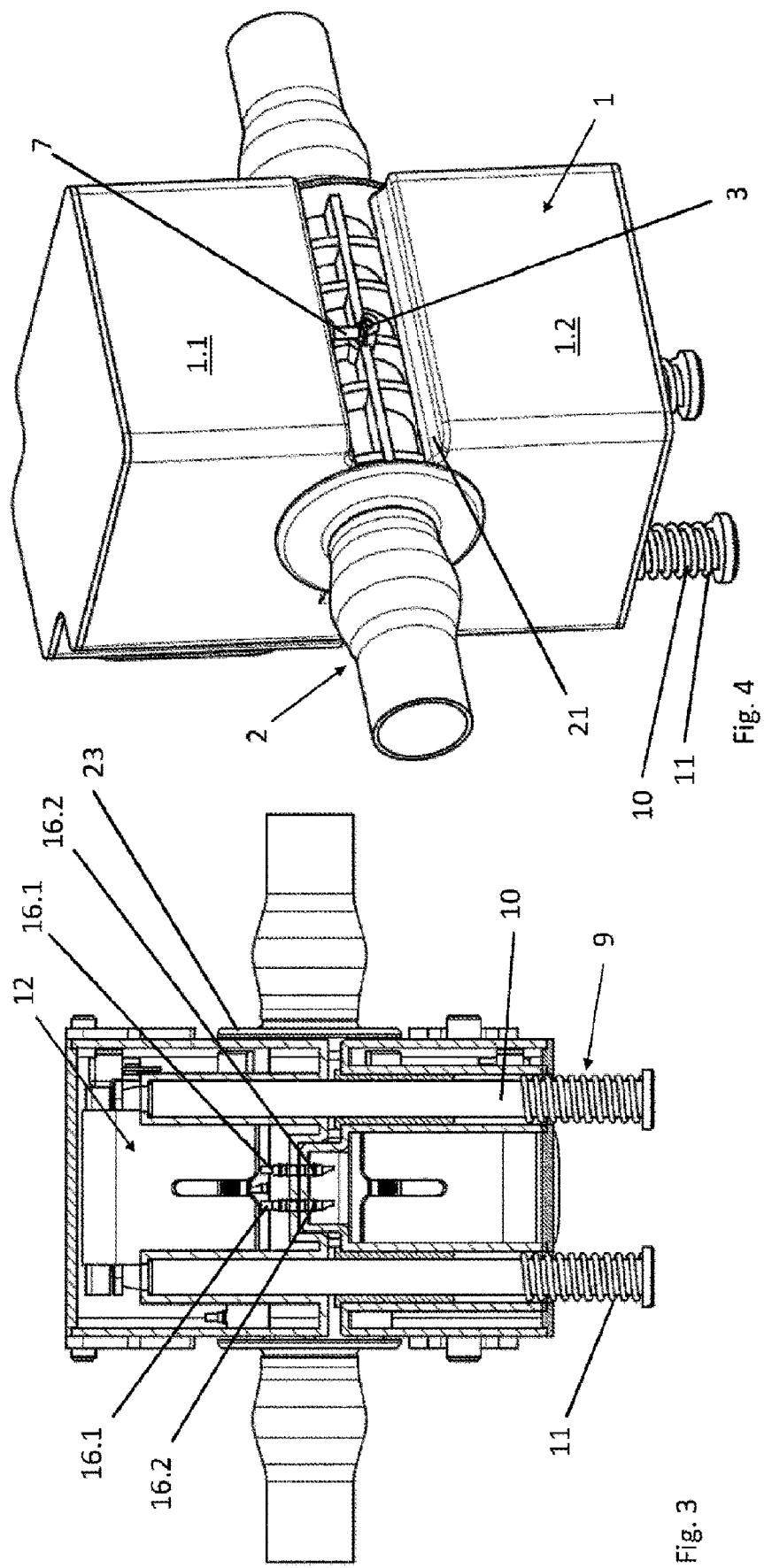

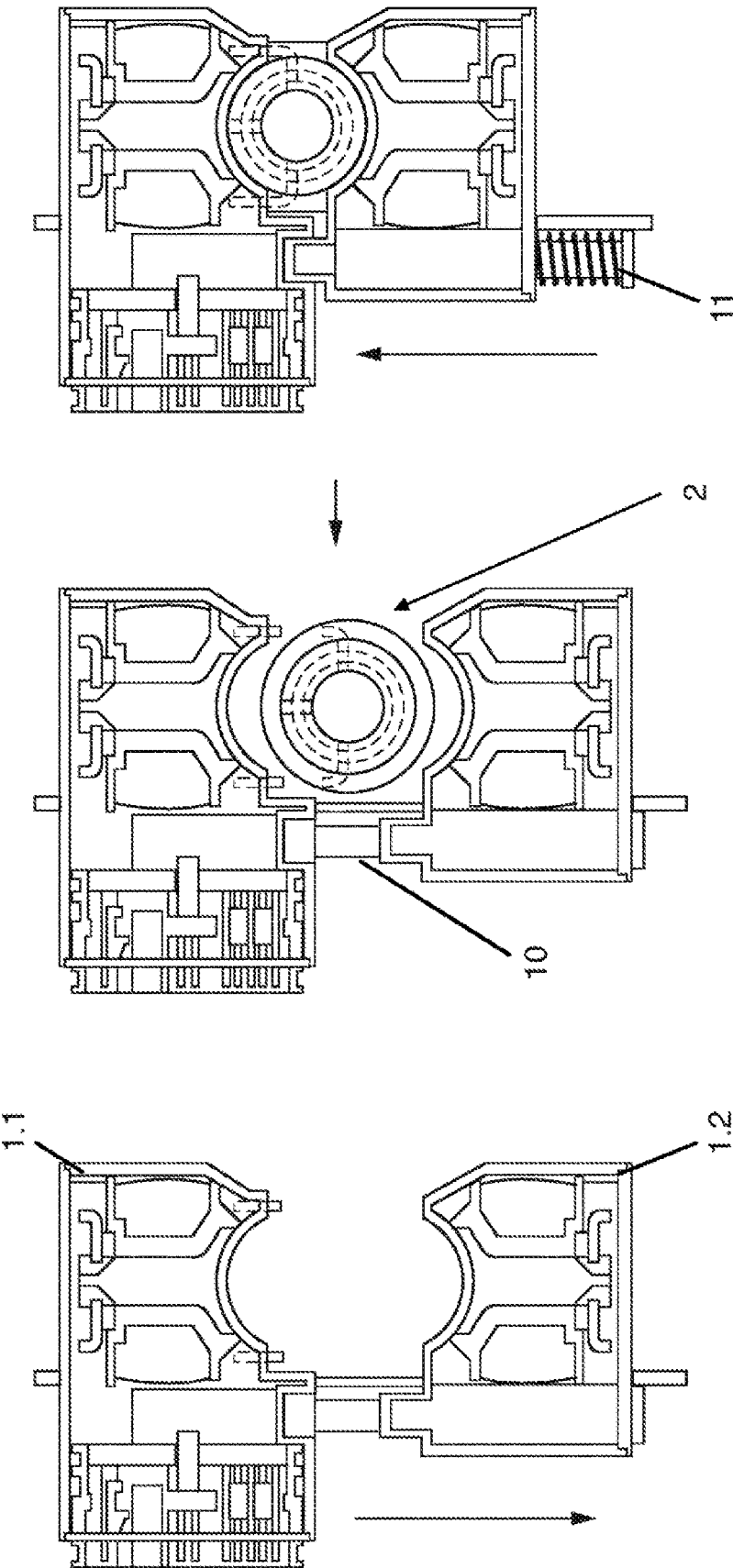

MAGNETIC-INDUCTIVE FLOWMETER

CROSS-REFERENCE TO RELATED APPLICATIONS

The present application is related to and claims the priority benefit of German Patent Application No. 10 2019 126 013.2, filed on Sep. 26, 2019, and International Patent Application No. PCT/EP2020/073415, filed Aug. 20, 2020, the entire contents of which are incorporated herein by reference.

TECHNICAL FIELD

The present disclosure relates to flowmeters, in particular, magnetic-inductive flowmeters that use an exchangeable measurement tube.

BACKGROUND

Magnetic-inductive flowmeters are used for determining the flow rate and the volumetric flow of a flowing medium in a pipeline. A magnetic-inductive flowmeter has a magnet system that generates a magnetic field perpendicular to the direction of flow of the flowing medium. Single coils are typically used for this purpose. In order to realize a predominantly homogeneous magnetic field, pole shoes are additionally formed and attached such that the magnetic field lines run over the entire pipe cross-section substantially perpendicularly to the transverse axis or in parallel to the vertical axis of the measuring pipe. A measurement electrode pair attached to the lateral surface of the measuring pipe taps an electrical measurement voltage or potential difference which is applied perpendicularly to the direction of flow and to the magnetic field and occurs when a conductive medium flows in the direction of flow when the magnetic field is applied. Since the tapped measurement voltage according to Faraday's law of induction depends on the speed of the flowing medium, the flow measurement value can be determined from the induced measurement voltage u, which, depending on the application, comprises the flow rate u, with the addition of a known pipe cross section, the volume flow V, or, with the addition of the medium density, the mass flow rate m.

Magnetic-inductive flowmeters, which use exchangeable measurement tubes, are already known. Such a magnetic-inductive flowmeter is taught, for example, in DE 10 2016 118 064 A1.

DE 10 2010 031 433 A1 teaches a replaceable, partially U-shaped disposable insert having at least three measurement electrodes, which is designed to be used in the measurement tube of a conventional magnetic-inductive flowmeter. Two of the at least three measurement electrodes are contacted via the measurement electrodes mounted in the measurement tube and connected to the measurement circuit. The magnetic field generated by the magnet system of the magnetic-inductive flowmeter penetrates through the measurement tube and through the wall of the disposable insert and generates a charge separation in the medium flowing through the disposable insert, which is tapped as a measurement voltage by means of the at least three measurement electrodes. However, the disadvantage of this invention is that the mounting of the disposable insert in the measurement tube is highly laborious, particularly in clean room conditions.

SUMMARY

The present disclosure is based on the object of providing a magnetic-inductive flowmeter that, in clean room conditions, enables a simple replacement of the measurement tube or simple insertion of the measurement tube into the measuring system.

The object is achieved by the magnetic-inductive flowmeter according to the present disclosure.

The magnetic-inductive flowmeter according to the invention comprises:
   a housing;
   a measurement tube for guiding a flowable medium;
   at least two measurement electrodes, which are mounted in the measurement tube,
      wherein the measurement electrodes each have a front region for forming a galvanic contact with the medium;
   a magnetic field-generating device for generating a magnetic field permeating the measurement tube,
      wherein the magnetic field-generating device comprises a first coil and a second coil,
      wherein the first coil surrounds a first coil core, the second coil surrounds a second coil core;
   at least two connection contacts are each electrically connected to a measurement circuit, which is preferably arranged in the housing;
   and is characterized in that
   the housing has a two-piece design and comprises a first housing part and a second housing part,
      wherein the first coil and the first coil core are arranged in the first housing part,
      wherein the second coil and the second coil core are arranged in the second housing part,
   in that the measurement tube is arranged in a positively locking or force-fitting manner between the first and second housing parts, and
   the first housing part and the second housing part are interconnected by means of a guide element,
      wherein the distance between the two housing parts is linearly adjustable by means of the guide element.

Until now, a replaceable measurement tube had to be inserted into a receptacle, which was realized as either a U-shaped receptacle or opening in the housing or as a measurement tube inlet of a conventional flowmeter. For easier mounting of the measurement tube, the receptacle or opening could not subsequently be expanded further.

The two-piece design of the housing and the connection of the two parts to the guide element allow an easy-to-handle solution to be realized. Before the measurement tube is inserted, the distance between the two parts of the housing can be increased, so that the opening formed by the two housing parts is expanded and the measurement tube can be readily inserted. After the measurement tube is inserted, the distance between the two housing parts can be reduced again via the guide element, so that the measurement tube is arranged in a positively locking or force-fitting manner between the first and second housing parts.

Guide elements used in mechanical engineering enable a body or a point of a body to be guided on a predetermined path. It is particularly advantageous for the present application if the guide element facilitates a linear movement of at least one housing part. Linear guides or straight guides are suitable for this purpose. Examples of linear positioning and handling systems are one-axis systems, two-axis systems, multi-axis systems or electromechanical cylinders. Furthermore, a guide element also comprises drive units, such as linear motors, pneumatic cylinders and hydraulic cylinders.

The adjustment of the distance between the two housing parts can be realized in that both housing parts each move along the guide element linearly toward one another or away from one another. It is particularly advantageous if one of the two housing parts is fixed and only the other housing part is linearly adjustable.

Guide elements have a guide body. This can be designed as a guide rail, in particular a round rail or as a roller guide, in particular as a profile rail guide or as a cage rail guide.

Advantageous embodiments of the invention are the subject matter of the dependent claims.

One embodiment provides that the guide element is formed from at least one guide body that is in particular at least partially cylindrical, and a spring, in particular a coil spring,
    wherein the spring, which is in particular designed as a tension spring or compression spring, is arranged on the guide body, such that the spring of one of the two housing parts presses against the other housing part or pulls both housing parts together.

It is advantageous if the guide element has at least one spring that pushes or pulls the two housing parts together. This is a compression or tension spring. When the measurement tube is being mounted, a housing part is moved along the guide body, so that the spring is compressed or pulled apart. Force must be applied for this to happen and for the moved housing part to remain in position. This force can be applied, for example, by the fitter or with the aid of a drive unit.

If the measurement tube is in the installation position, the force acting can be reduced, which results in the spring bringing together the two housing parts again, so that the measurement tube is fixed in a force-fitting manner between the two housing parts.

A realization of the guide element from a guide body and a spring is of particular interest for applications in the clean room area, since impurities that arise due to wear or hydraulic oil are thereby avoided.

One embodiment provides that a first return body is arranged in the first housing part,
    wherein a second return body is arranged in the second housing part,
    wherein the return bodies each have two legs and a base,
    wherein the base covers the respective coil core at the end,
    wherein the legs extend laterally to the respective coil and are inclined toward the measurement tube.

Return bodies serve to collect the magnetic field lines, which leave the coil core but do not intersect or only partially intersect the measurement tube, and to guide them to the opposite pole without as little loss as possible. Therefore, the return bodies ideally touch both coil cores in each case on the sides facing away from the measurement tube. The return bodies are usually formed by a plurality of interconnected metal sheets, which are preferably produced by punch packing. However, return bodies that are formed from a single sheet metal part or from single-layer sheet metal parts are known.

The return bodies are usually embodied in the mounted state such that they completely enclose the measurement tube in the cross section of a partial region of the measurement tube. As a rule, the return body is formed in two parts, wherein the two parts overlap and are interconnected. The two return bodies are fastened to one another by means of a screw or a snap-in lock, and the contact is thus ensured.

According to the invention, the return bodies have a base and two legs. Ideally, a U-shape is formed thereby. A similar form is known from DE 10 2011 079 352 A1. A return body can be formed in one piece or also in a plurality of pieces, in particular in two pieces. In this case, a return body consists of two L-shaped parts, which together substantially form a U-shape. Two return bodies form a return arrangement. For one thing, the two return bodies can contact when the flowmeter is in the closed state. For this purpose, openings in the housing are necessary through which at least one of the return bodies extends. However, depending on the application, a contact between the two return bodies can be omitted. In this case, the respective return bodies are separated by the walls of the two housing parts.

One embodiment provides that a closure element, which is in particular attached to the housing, is designed to connect the first return body to the second return body,
    wherein the closure element is realized as a pivotable flap or as a linearly displaceable sheet metal part.

It is advantageous if, in addition to the spring, which ensures a force-fitting connection of the measurement tube between the two housing parts, a closure element is also arranged, with which an additional fixing is realized. Particularly in the case of applications in which flexible hose and/or plastic pipe systems are used, there is a risk that the measured values are distorted when forces transmitted via the pipe system pull the spring apart or compress it and thus misalign the measurement tube in its installation position, which leads to a loss of the electrical contact between the connection contacts and measurement electrodes.

The closure element preferably comprises at least one rotary joint, a locking bolt and a closure flap. The closure flap is movably connected to the rotary joint and rotates about an axis of rotation defined by the rotary joint. The rotary joint is attached to one of the two parts of the housing. The locking bolt to the respective other housing part. When closing the closure element, the closure flap is rotated about the rotary joint until the locking bolt fits tightly in a molding introduced into the closure flap. In this state, the two housing parts cannot be dismantled. The measurement tube can no longer be removed from its installation position without opening the closure element again beforehand.

It is particularly advantageous if the closure element does not just ensure that the measurement tube is fixed between the housing parts, but instead also establishes a connection between the two return bodies in the closed state. This can take place, for example, with the aid of the rotary joint and the locking bolt, both of which are in contact with one of the two return bodies. If the closure flap is closed, a closed contact is formed between the two return bodies via the closure unit. If the closure unit is made of a ferromagnetic material, it is additionally designed to guide the magnetic field from the first return body to the second return body and vice versa.

Alternatively, the two return bodies can also be connected via a linearly displaceable sheet metal part, which is attached to one of the two housing parts. Before the measurement tube is guided through the opening, the sheet metal part is displaced. If the measurement tube is in the installed position, the sheet metal part is moved again along the opening until it contacts both return bodies.

One embodiment provides that a first plug connection is arranged in the first housing part, which is electrically connected to an operating circuit,
    wherein a second plug connection is arranged in the second housing part, said second plug connection being designed to be complementary to the first plug connection and being electrically connected to the second coil
    wherein, in a closed state of the magnetic-inductive flowmeter, an electrical connection is established between the first and the second plug connector.

The fact that the housing is formed in two pieces creates the problem of the electrical connection of the individual coils to the operating circuit, which is configured to supply the coils with power. It is, therefore, advantageous if both housing parts have plug connections that are designed to be complementary to one another, so that in the closed state an electrical connection is realized between the operating circuit and the individual coils.

If the operating circuit is arranged in the first housing part, the electrical connection of the operating circuit to the first coil is not critical. It is possible to provide an opening in both housing parts, through which, for example, a cable extends to supply the second coil. However, since the two housing parts are designed to be movable or partially movable via the linear guide element, the cable can quickly be damaged.

It is, therefore, advantageous for the two housing parts to have complementary plug connections. This thus avoids cables running outside the housing and additionally ensures that the meter is operated only when it is also in the closed state.

The operating circuit does not have to be arranged in the first housing part, but can also be located outside the housing and be connected to the coil located there via a plug connector, which is arranged in one of the two housing parts.

One embodiment provides that the housing parts each have at least one surface, which faces a surface of the respective other housing part,
wherein the connection contacts are arranged on said surface and protrude from the surface,
wherein the connection contacts are resilient.

In conventional measurement tubes, the measurement electrodes are arranged diametrically and connected via contact bodies, for example, cables, to a measurement circuit. The cables run along the outer wall of the measurement tube to the coil core, where they extend between the coil core and the coil sleeve to the end region of the coil core (see DE 20 2014 103 426 U1). The entire arrangement of the cables is as symmetrical as possible with respect to a longitudinal plane of the measurement tube, which extends through the two coils. The cables run up to the measurement circuit from the end of the coil core. However, with replaceable measurement tubes, wiring the measurement electrodes again and again is laborious. It is, therefore, advantageous if connection contacts are provided in the housing, which are themselves electrically connected to the measurement circuit and which, in the installed state of the measurement tube, have an electrical contact with the measurement electrodes in the measurement tube.

Due to the fact that the connection contacts are resilient, wear of the contact during repeated insertion and removal of the replaceable measurement tube can be minimized.

Measurement circuits in the field of flow measurement technology are sufficiently known. The object of the measurement circuit is to detect very small absolute values and changes in the respective measurement variable. There is a plurality of different embodiments, each having its advantages and disadvantages.

On the one hand, the measurement circuit may be configured to tap a potential at one of the measurement electrodes in relation to a reference potential. Thus, even if one of the two measurement electrodes fails, the flow rate can still be determined on the basis of a determined potential. The housing potential or a ground potential is suitable as the reference potential. The magnetic-inductive flowmeter can have a grounding electrode connected to the reference potential. The two measurement variables can accordingly be the electrical potentials prevailing and determined at each of two measurement electrodes.

On the other hand, the measurement circuit may be designed to detect and record a potential difference prevailing between two measurement electrodes.

A measurement circuit therefore comprises an analog/digital converter which converts the incoming signals, in this case the potential difference currently present at the respective measurement electrode pair or the electrical potential prevailing at the respective measurement electrode, into digital data, which are then further processed or stored by an evaluation circuit. However, other measuring converters or measuring transducers from the field of digital measurement technology are also known and suitable for detecting a measurement voltage or an electrical potential.

The evaluation circuit is configured to process the measurement values of the respective measurement variables measured by the measurement circuit and to determine the measurement variable sought. An evaluation circuit therefore usually comprises microprocessors, amplifiers, and noise filters. The measurement and evaluation circuit can be of modular design and can communicate by means of a wireless connection, or can be part of a single electronic measurement and evaluation unit, which is arranged in a housing of the flowmeter.

One embodiment provides that the measurement electrodes are arranged on opposite sides of the measurement tube,
wherein the measurement electrodes are pin-shaped and have a depression at respective ends, which depressions are embodied as receptacle for the connection contacts.

In conventional measurement tubes, the measurement electrodes are arranged diametrically. The front surface of the measurement electrodes is usually designed to form a galvanic contact with the flowing medium. However, measurement tubes that have measurement electrodes, the side surfaces of which are in galvanic contact with the medium, are also known.

It is particularly advantageous if the ends of the measurement electrodes have depressions, which are formed complementarily to the resilient connection contacts. Sufficient contacting of the measurement electrodes can thereby be ensured. When the measurement tube is inserted, the resilient connection contacts are displaced initially and then snap into the receptacle.

One embodiment provides that the measurement electrodes are mounted in a cross-sectional plane of the measurement tube,
wherein a grounding electrode for forming a galvanic contact with the medium with respect to the cross-sectional plane is attached at a distance in the measurement tube,
wherein a connection contact to electrically connect to a reference potential, in particular to a ground potential, is arranged in the first or in the second housing part.

Flowmeters that have measurement tubes designed to be electrically insulating require sufficient grounding in the form of a grounding ring or a grounding electrode. For a more compact design of the magnetic-inductive flowmeter, it is advantageous for the grounding electrode to be configured offset from the cross-sectional plane intersecting the measurement electrode, since, in this way, the magnetic field-generating device and the connection contacts for the grounding electrode do not impede each other. Preferably, the cross-sectional plane, which intersects the grounding electrode in the flow direction, is arranged downstream of the cross-sectional plane in which the measurement electrodes are attached. The offset arrangement of the grounding electrode is also part of a poke-yoke system and thus avoids the defective mounting of the measurement tube in the magnetic-inductive flowmeter.

One embodiment provides that at least one housing part has a front surface,
wherein a normal vector of the front surface is composed of a vector parallel to the longitudinal axis of the guide element and a vector parallel to a transverse axis of the measurement tube connecting two measurement electrodes,
wherein the front surface is configured to convert force, which acts on the front surface, into a linear movement of a housing part away from the respective other housing part when the measurement tube is being inserted.

It is particularly advantageous if the housing in the front region of the housing has a front surface, the normal of which is inclined with respect to the insertion direction of the measurement tube, such that, when the measurement tube is being inserted between the two housing parts and the measurement tube is being pressed against the front surface, the force acting in the insertion direction is deflected into a force parallel to the longitudinal direction of the linear guide element. This has the effect of pressing apart or compressing the spring by pressing the measurement tube against the front surface and thus the distance between the two housing parts increases. The distance increases until the measurement tube has reached the installation position. The distance decreases again thereafter and the measurement tube is attached not only in a positively locking manner, but also in a force-fitting manner, between the two housing parts. This simplifies the insertion of the measurement tube, so that the housing parts do not first have to be pulled apart before the measurement tube is inserted. Pressing the measurement tube against the front surface is sufficient.

One embodiment provides that the measurement electrodes each have a measurement electrode body, which is in particular L-shaped.

The L-shaped measurement electrode body ensures that the contact points between measurement electrode and connection contacts are located close to the housing. This prevents the connection contacts from impeding the insertion of the measurement tube.

The measurement tube body of the measurement tube is preferably produced in one piece by means of a primary shaping process, in particular by means of injection molding. In the same process, the measurement electrodes can also be arranged in the measurement tube and overmolded with the material of the measurement tube body. It is, therefore, advantageous if the measurement electrodes are also formed in one piece, since production steps can be saved as a result.

One embodiment provides that the measurement electrode body is formed from two parts,
wherein an end region of the first part is formed complementarily to the front region of the second part,
wherein the second part is connected in a positively locking manner to the first part.

Although an additional mounting step is required, in which the second part of the measurement electrode body is inserted into a receptacle provided in the measurement tube body, but the measurement electrode body does not first have to be reformed in an L-shape by a reforming process, in particular by a bending process. This can result in defects, particularly in measurement electrodes having a small cross section.

One embodiment provides that the measurement tube comprises at least two guide disks that serve as positioning device,
wherein the guide disks each have a contact surface,
wherein the guide disks are attached to the measurement tube, such that the contact surfaces face each other,
wherein the guide disks are spaced apart and the contact surfaces are in contact with the housing.

The guide disks ensure that the measurement tube is inserted to fit precisely into the intended mounting position and that the measurement electrodes and the connection contacts are located in a common plane, thereby preventing faulty contacting. Furthermore, a displacement of the measurement tube in the longitudinal direction is prevented.

Further structures in the measurement tube body, based on the poka-yoke principle, ensure that only one installation option exists for the measurement tube, so that it is always ensured that the measurement electrodes and the grounding electrode are contacted by the connection contacts.

One embodiment provides that the magnetic field-generating device, in particular pole shoes of the magnetic field-generating device, is separated from the measurement tube by a wall of the housing.

One embodiment provides that the first and the second housing parts each have an opening,
wherein a leg of the first and/or of the second return body extends through the respective opening,
wherein, in a closed state of the magnetic-inductive flowmeter, contact between the first and the second return body results.

Typical flowmeters with replaceable measurement tubes have highly simplified magnet systems. As a result, the measurement error is also in single percentages. It is thus particularly advantageous if the two return bodies are interconnected, since stray fields can thereby be reduced.

It is, therefore, particularly advantageous if openings are introduced in the two housing parts through which the return bodies extend. In the open state, the return bodies do not contact each other and the measurement tube can be inserted between the two housing parts. In the closed state, the two return bodies contact each other and the path of the magnetic field lines along the return body is closed again.

One embodiment provides that the measurement tube is made of an insulating material, in particular a plastic and preferably polyether ether ketone (PEEK), polyaryl ether ketones (PAEK), polyphenylsulfones (PPSU), polyethersulfones (PESU), polysulfones (PSU), polyarylamides (PARA), glass and/or ceramic.

There is a demand for flowmeters with disposable measurement tubes for biopharmaceutical applications. For this purpose, the materials that come into contact with the medium have to be biocompatible and gamma-sterilizable. It is, therefore, particularly advantageous if the measurement tube is made of one of the aforementioned materials, since they meet biopharmaceutical requirements.

BRIEF DESCRIPTION OF THE DRAWINGS

The invention is explained in greater detail with reference to the following figures. The following are shown:
FIG. 1 shows a cross-section of a measuring arrangement for a measurement tube of the present disclosure;
FIG. 2 shows a longitudinal section of the measuring arrangement to the measurement tube;
FIG. 3 shows a longitudinal section of the housing;
FIG. 4 shows a perspective view of the measuring arrangement housing with measurement tube inserted;

FIG. 7 shows individual steps for mounting the measurement tube in the housing as a cross-sectional view.

DETAILED DESCRIPTION

Figure 6:
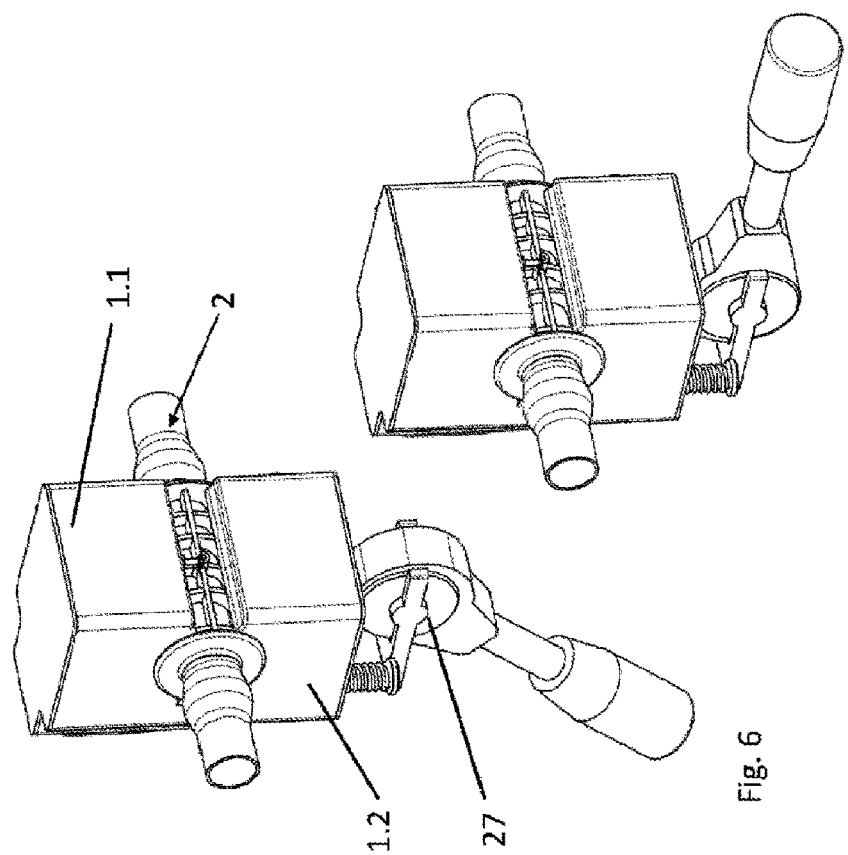
FIG. 6 shows a perspective view of the measuring arrangement with an eccentric lever.

The structure and measuring principle of a magnetic-induction flowmeter are known in principle. FIG. 1 shows an embodiment of the magnetic-inductive flowmeter according to the invention. A medium having an electrical conductivity is conducted through a replaceable measurement tube 2. A magnetic field-generating device is arranged in a housing 1 in such a way that the magnetic field lines are oriented substantially perpendicular to a longitudinal direction defined by the measurement tube axis. A saddle coil or a pole shoe 24 with an attached coil arrangement 5 and coil core 6 is preferably suitable as the magnetic field-generating device. When the magnetic field is applied, a flow-dependent potential distribution is produced in the measurement tube 2 and is tapped with two opposing measurement electrodes 3 attached to the inner wall of the measurement tube 2. As a rule, these are arranged diametrically and form an electrode axis or are intersected by a transverse axis, which runs perpendicular to the magnetic field lines and the longitudinal axis of the tube. The volumetric flow V of the medium is determined based on the tapped measurement voltage U, taking into account the magnetic flux density, the flow rate u and, with additional consideration of the tube cross-sectional area. If the medium density is additionally known, the mass flow m can also be monitored. In order to prevent the measuring voltage applied to the first and second measurement electrodes 3 from being conducted away via the tube, the inner wall is lined with an insulating material, for example, a plastic liner. In measurement tubes made of insulating material, there is no need to apply an insulating coating. A measurement circuit 8 is configured to detect the measurement voltage applied to the measurement electrodes 3. An evaluation circuit is designed to determine the flow measurement values of the medium from the detected measurement voltage. The magnetic field-generating device is controlled via an operating circuit 17. Commercially available magnetic-inductive flowmeters have two further electrodes in addition to the measurement electrodes. For one thing, a fill level monitoring electrode, which is optimally attached to the highest point in the measurement tube 2, serves to detect partial filling of the measurement tube and is configured to pass this information to the user and/or to take into account the fill level when determining the volume flow. Furthermore, a grounding electrode 20, which in this embodiment is attached in place of the fill-level electrode at the highest point of the tube cross-section, is used to ensure sufficient grounding of the medium. This is necessary in particular in measurement tubes 2 with an electrically insulating measurement tube body 31.

The magnetic field-generating device and the individual circuits 8, 17 are accommodated in the housing 1. It is, however, also possible to arrange the individual circuits outside the housing 1, for example, in a control system, and to realize the connection via the connector 26, which is preferably designed as a plug connector.

Typically, the measurement electrodes 3 extend from the measurement tube interior through the measurement tube body 31 into the interior of the housing, where they are electrically connected to the measurement circuit 8. In this embodiment, no measurement electrodes 3 are arranged in the housing 1. Instead, the housing 1 has connection contacts 7, which are configured to contact the measurement electrodes 3 of the measurement tube 2 and thus to create an electrical contact between the measurement electrode 3 and the measurement circuit 8. The connection contacts 7 can be resilient. They extend through the housing wall 25 of one of the two housing parts 1.1, 1.2. The measurement electrodes each have a front region 4, which contacts the flowing medium. The front region 4 can have a mushroom, pointed head, flat head, cylindrical, conical or pin shape. The side surfaces of the measurement electrode extend in the measurement tube body 31 and have no contact with the medium. Furthermore, the measurement electrode body 22 of the respective measurement electrodes 3 is formed in two pieces. The first part of the measurement electrode body 22 comprises the front region 4 and additionally a receptacle 19 for the second part of the measurement electrode body 22. The second part of the measurement electrode body 22 has a front region, which is complementary to the receptacle 19, as a result of which a positively locking connection is realized. The end region of the second part of the measurement electrode body 22 is formed complementarily to the connection contact 7. The second part of the measurement electrode body 22 is inserted in a receptacle of the measurement tube body 31. The two housing parts 1.1, 1.2 each have at least one surface 18, which faces the surface of the respective other housing part. This surface 18 contacts the measurement tube 2. One of these two surfaces comprises the connection contacts 7.

According to the invention, the housing 1 has a two-piece design. A first housing part 1.1 has a first coil 5.1 with a first coil core 6.1 and a second housing part 1.2 has a second coil 5.2 with a second coil core 6.2. In this embodiment, the pole shoe 24 and the coil core 6 are integrally formed. The pole shoe 24 bears against the inner side of the respective housing wall 25. A return arrangement 12 is arranged in each housing part. The return arrangement 12 comprises two return bodies 12.1, 12.2, each of which consists of a single bent sheet metal part or a bent sheet metal part formed from a plurality of layers. The return bodies 12.1, 12.2 are each U-shaped. This means that they have a region, which is shaped as a base 14 and two regions which are formed as legs 13. The base 14 contacts the side of the coil core 6 facing away from the measurement tube and the legs 13 extend along the coil arrangement 5 in the direction of a longitudinal plane intersecting the two measurement electrodes 3. However, the two return bodies 12.1, 12.2 are not in contact. Not shown in the embodiment, but also claimed, are openings in the two housing parts 1.1, 1.2 through which at least one of the two return bodies 12.1, 12.2 extends, whereby, in the closed state of the measuring system, contact between the two return bodies 12.1, 12.2 is realized. According to this embodiment, the second housing part 1.2 can be moved so far away from the first housing part 1.1 that the measurement tube is inserted into the installation position and is not hindered by the return arrangement 12.

The two housing parts 1.1, 1.2 are connected to one another via a linear guide element 9. The guide element 9 comprises two guide bodies 10 and a spring 11 in each case. The spring 11 is a cylindrical helical compression spring. The two guide bodies 10 are cylindrical round rails. If the second housing part 1.2 is moved, the spring 11 is compressed. The opening for the measurement tube 2, which is formed by the two housing parts 1.1, 1.2, is too small for the measurement tube 2. The second housing part 1.2 must be moved along by means of the guide element 9, so that the opening is large enough for the measurement tube 2. In addition, at least one housing part 1.1, 1.2 has a front surface 21, which is shaped such that, when the measurement tube 2 is pressed against the front surface 21, the second housing part 1.2 moves along the guide element 9 and the measurement tube 2 can be inserted into the installation position. For this purpose, the surface 18 has a normal that is neither perpendicular nor parallel to the longitudinal axis of the guide element 9, but is inclined toward the installation direction of the measurement tube 2. The second housing part 1.2 is thus displaced by pressing the measurement tube 2, and only when the opening is large enough for the measurement tube 2 to fit through does the second housing part 1.2 move back in the direction of the starting position. A positively locking and/or force-fitting connection between the housing 1 and the measurement tube 2 is thus achieved.

Both housing parts 1.1, 1.2 have plug connections 16, which are designed to be complementary to one another. As a result, an electrical connection is ensured between the operating circuit 17 and the second coil 5.2 arranged in the second housing part 1.2, without an additional cable having to run outside the two housing parts 1.1, 1.2. In the open state, the connection between the two plug connections 16 is open and a supply to the second coil 5.2 is interrupted.

FIG. 2 shows a longitudinal section along the measurement tube 2. In the first housing part 1.1 is a connection contact 7 for the grounding electrode 20, which is arranged in the measurement tube 2 and is configured to ensure a controlled potential in the medium. The connection contact 7 is connected to a reference potential, for example, a ground potential. The grounding electrode 20 is arranged offset in the longitudinal direction to the cross-sectional plane of the measurement tube 2 intersecting the two measurement electrodes 3.

Furthermore, the measurement tube 2 has two guide disks 23, each having two opposite sides that contact the side surfaces of the two housing parts 1.1, 1.2. This results in a precise-fit installation of the measurement tube 2.

FIG. 3 shows a longitudinal section along the housing 1. The two guide bodies 10 extend along a receptacle in the two housing parts 1.1, 1.2, wherein the receptacle in the first housing part 1.1 is embodied as a blind hole and the receptacle in the second housing part 1.2 is embodied as a through hole. The first housing part 1.1 sits on the guide bodies 10, in particular on the respective front surfaces, wherein the second housing part 1.2 is linearly movable along the guide body 10. Furthermore, the two guide elements 9 each have a spring 11. The latter is attached to the guide body 10 in such a way that guiding the second housing part 1.2 along the guide body 10 results in a compression of the spring 11. For this purpose, the guide body 10 has, in the end region, a support surface for the spring 11, the cross-sectional area of which is greater than the cross-sectional area along the region in which the spring 11 is arranged. If the second housing part 1.2 is moved, either the outer wall of the second housing part 1.2 or a stopper additionally arranged in the receptacle for the guide body presses against the two springs 11 and ensures the compression of the two springs 11.

FIG. 4 shows a perspective view of an embodiment of the magnetic-inductive flowmeter according to the invention with the measurement tube 2 in the installed state. The measurement tube can be inserted into the opening formed by the two housing parts 1.1, 1.2 until it abuts against a front surface 21. If the measurement tube 2 is pressed further in the direction perpendicular to the longitudinal axis of the guide body 10, the force acting is converted into a force parallel to the longitudinal axis of the guide body 10 and the second housing part 1.2 is guided along the guide body 10. How much force is necessary to move the second housing part 1.2 depends on the spring constant of the respective spring 11.

In this embodiment, the measurement electrode 3 has a one-piece design and has a receptacle for the associated connection contact 7. The connection contact 7 is resilient and can be lowered when the measurement tube 2 is inserted in the first housing part 1.1.

Figure 5:
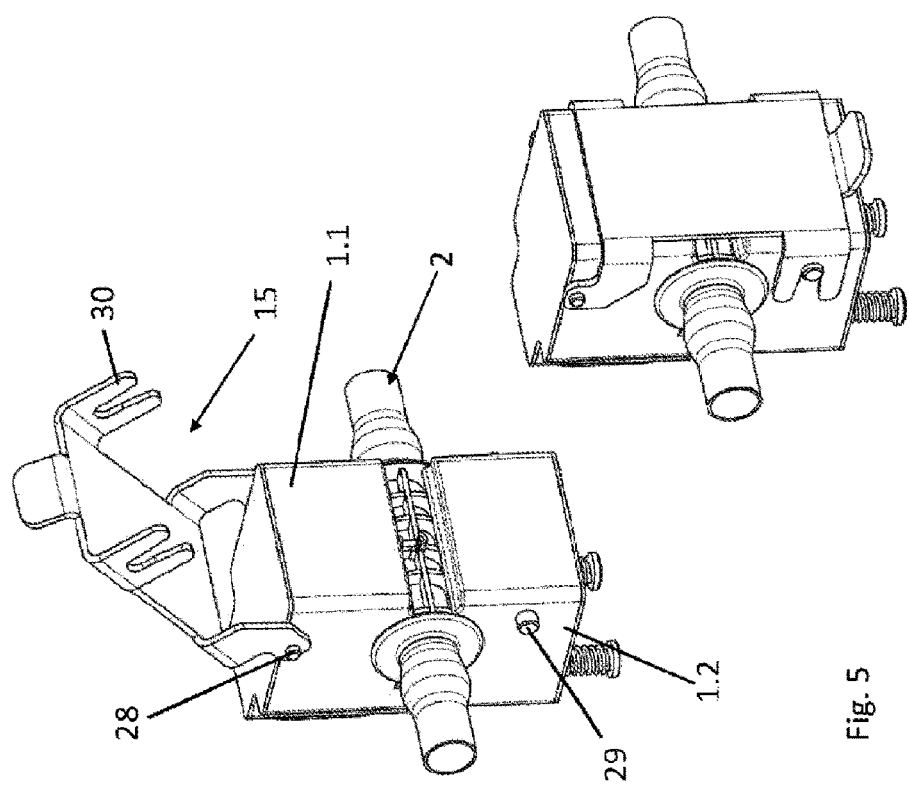
FIG. 5 shows a perspective view of the measuring arrangement with a closure element in the open and closed state.

FIG. 5 a perspective view of a further embodiment of the magnetic-inductive flowmeter according to the invention, which has a closure element 15. The closure element 15 has two rotary joints 28, a locking bolt 29 and a closure flap 30. The closure flap 30 can be moved about an axis of rotation defined by the rotary joints 28. In the closed state, a molding in the closure flap 30 surrounds the locking bolt 30. In this state, it is not possible to pull the two housing parts 1.1, 1.2 apart and thus not possible to remove the measurement tube 2.

FIG. 6 shows a perspective view of a further embodiment of the magnetic-inductive flowmeter according to the invention, which has an eccentric lever 27. If the measurement tube 2 is arranged between the two housing parts 1.1, 1.2, a fixing by an eccentric lever 27 ensures the further stabilization of the measuring arrangement. The fixing is carried out by throwing the eccentric lever 27, which has an axis of rotation that is offset with respect to the central axis. In this case, the second housing part is pressed further in the direction of the first housing part and the measurement tube is fixed more strongly. This embodiment is particularly advantageous when the measurement tube 2 has an exclusively positively locking arrangement between the two housing parts 1.1, 1.2.

FIG. 7 shows three individual steps for mounting the measurement tube 2 into the opening between the two housing parts 1.1, 1.2 as a cross-sectional representation. In the first step, the second housing part 1.2 is moved away from the first housing part 1.1, in which it is guided along the linear guide body 10. In the first step, the spring 11 is compressed. In the second step, the measurement tube 2 is guided into the opening. An arrow indicates the preferred installation direction. The shape of the measurement tube body ensures that the preferred installation direction is maintained and there is no incorrect installation position in which there is no sufficient contact between the measurement electrodes and the connection contacts. In the third step, the spring is relieved again and the second housing part 1.2 is returned to its starting position. This results in a positively locking and/or force-fitting connection between the measurement tube 2 and the two housing parts 1.1, 1.2.

Figure 8:
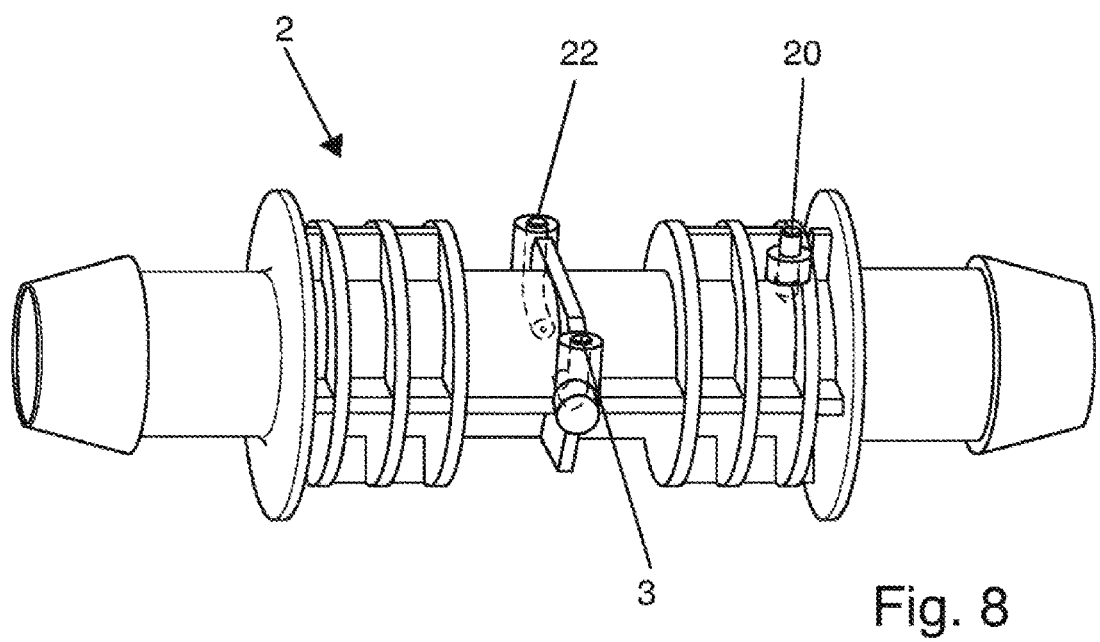
FIG. 8 shows an embodiment of the replaceable measurement tube with L-shaped measurement electrode bodies.

FIG. 8 shows a further embodiment of the replaceable measurement tube 2. The measurement tube 2 has two measurement electrodes 3, each having an L-shaped measurement electrode body 22. The measurement electrode bodies 22 are bent by means of a bending process and in this form are placed in the casting mold with the material of the measurement tube body. A pin-like grounding electrode 20 is arranged offset to the transverse axis, in which the measurement electrodes 3 lie. The measurement electrodes 3 and the grounding electrode 20 have open ends, which are formed complementarily to the front regions of the connection contacts in the housing (not shown).

The invention claimed is:

1. A magnetic-inductive flowmeter, comprising:
a housing comprising a first housing part and a second housing part, wherein the first housing part and the second housing part are connected via a guide element, which is configured to enable a distance between the first and second housing parts to be linearly adjustable;
a measurement tube configured to guide a flowable medium therethrough, wherein the measurement tube is disposed in a positively locking or force-fitting, reversible manner between the first and second housing parts;
at least two measurement electrodes mounted in the measurement tube, wherein the measurement electrodes each include a front area adapted to form a galvanic contact with the medium;
a magnetic field-generating device configured to generate a magnetic field that passes through the measurement tube, the magnetic field-generating device comprising a first coil and a second coil, wherein the first coil surrounds a first coil core, wherein the second coil surrounds a second coil core, wherein the first coil and the first coil core are disposed in the first housing part, and wherein the second coil and the second coil core are disposed in the second housing part;
a measurement circuit disposed in the housing; and
at least two connection contacts, each electrically connected to the measurement circuit, and each disposed in either the first or second housing part, respectively,
wherein the guide element includes at least one guide body, which is at least partially cylindrical, and a spring,
wherein the spring, which is a tension spring or compression spring, is arranged on the guide body such that the spring presses one of the first or second housing parts against the respective other housing part or such that the spring pulls the first and second housing parts together.

2. The flowmeter of claim 1, further comprising a first return body disposed in the first housing part and a second return body disposed in the second housing part, wherein the first and second return bodies are each configured to guide the magnetic field and each includes two legs and a base, which base covers a respective coil core of the first and second coil cores at an end thereof, and wherein the legs extend laterally to the respective coil and are inclined toward the measurement tube.

3. The flowmeter of claim 2, further comprising a closure element attached to the housing and configured to connect the first return body to the second return body, wherein the closure element includes a pivotable flap or a linearly displaceable sheet metal part.

4. The flowmeter of claim 1, wherein the measurement electrodes are disposed on opposite sides of the measurement tube, and wherein the measurement electrodes are each pin-shaped with a depression at an end thereof, which depression is configured as a receptacle for a corresponding connection contact.

5. The flowmeter of claim 1, wherein the measurement electrodes are attached in a cross-sectional plane of the measurement tube,
wherein a grounding electrode configured to forming a galvanic contact with the medium is attached to the measurement tube at a distance with respect to the cross-sectional plane, and
wherein another connection contact configured to electrically connect the grounding electrode to a reference potential is disposed in the first or second housing part.

6. The flowmeter of claim 1, wherein at least one of the first and second housing parts includes a front surface in which a normal of the front surface is composed of a vector parallel to a longitudinal axis of the guide element and a vector parallel to a transverse axis of the measurement tube that connects two measurement electrodes,
wherein the front surface is configured as to convert a force that acts on the front surface into a linear movement of at least one of the first and second housing parts away from the respective other housing part when the measurement tube is being introduced therebetween.

7. The flowmeter of claim 1, wherein the measurement electrodes each include an L-shaped measurement electrode body.

8. The flowmeter of claim 7, wherein each measurement electrode body includes a first part and a second part, wherein an end area of the first part is configured complement a front area of the second part, and wherein the second part is connected in a positively locking manner to the first part.

9. The flowmeter of claim 1, wherein the measurement tube includes at least two guide disks configured to facilitate positioning the measurement tube within the housing in a closed state of the flowmeter, wherein the guide disks are spaced apart,
wherein the guide disks each include a contact surface, wherein the guide disks are affixed to the measurement tube such that each contact surface faces the other and each contacts the housing in the closed state.

10. The flowmeter of claim 1, wherein the magnetic field-generating device is separated from the measurement tube by a wall of the housing.

11. The flowmeter of claim 10, wherein the magnetic field-generating device includes a respective pole shoe at a corresponding end of each of the first and second coil cores, wherein each pole show is separated from the measurement tube by the wall.

12. The flowmeter of claim 2, wherein the first and second housing parts each include an opening, wherein a corresponding leg of the first and second return bodies extends through the respective opening such that the first return body contacts the second return body in a closed state of the magnetic-inductive flowmeter.

13. The flowmeter of claim 1, wherein the measurement tube comprises an electrically insulating material.

14. The flowmeter of claim 13, wherein the insulating material is at least one of polyether ether ketone (PEEK), polyaryl ether ketone (PAEK), polyphenylsulfone (PPSU), polyethersulfone (PESU), polysulfone (PSU), polyarylamide (PARA), glass and ceramic.

15. A magnetic-inductive flowmeter, comprising:
a housing comprising a first housing part and a second housing part, wherein the first housing part and the second housing part are connected via a guide element, which is configured to enable a distance between the first and second housing parts to be linearly adjustable;
a measurement tube configured to guide a flowable medium therethrough, wherein the measurement tube is disposed in a positively locking or force-fitting, reversible manner between the first and second housing parts;
at least two measurement electrodes mounted in the measurement tube, wherein the measurement electrodes each include a front area adapted to form a galvanic contact with the medium;
a magnetic field-generating device configured to generate a magnetic field that passes through the measurement tube, the magnetic field-generating device comprising a first coil and a second coil, wherein the first coil surrounds a first coil core, wherein the second coil surrounds a second coil core, wherein the first coil and the first coil core are disposed in the first housing part, and wherein the second coil and the second coil core are disposed in the second housing part;

a measurement circuit disposed in the housing; and at least two connection contacts, each electrically connected to the measurement circuit, and each disposed in either the first or second housing part, respectively, wherein a first plug connector is disposed in the first housing part and electrically connected to an operating circuit, and wherein a second plug connector is disposed in the second housing part and electrically connected to the second coil, the second plug connector complementary to the first plug connector, wherein, in a closed state of the flowmeter, an electrical connection is established between the first and the second plug connectors.

16. A magnetic-inductive flowmeter, comprising:

a housing comprising a first housing part and a second housing part, wherein the first housing part and the second housing part are connected via a guide element, which is configured to enable a distance between the first and second housing parts to be linearly adjustable;

a measurement tube configured to guide a flowable medium therethrough, wherein the measurement tube is disposed in a positively locking or force-fitting, reversible manner between the first and second housing parts;

at least two measurement electrodes mounted in the measurement tube, wherein the measurement electrodes each include a front area adapted to form a galvanic contact with the medium;

a magnetic field-generating device configured to generate a magnetic field that passes through the measurement tube, the magnetic field-generating device comprising a first coil and a second coil, wherein the first coil surrounds a first coil core, wherein the second coil surrounds a second coil core, wherein the first coil and the first coil core are disposed in the first housing part, and wherein the second coil and the second coil core are disposed in the second housing part;

a measurement circuit disposed in the housing; and at least two connection contacts, each electrically connected to the measurement circuit, and each disposed in either the first or second housing part, respectively, wherein the first and second housing parts each include at least one surface that faces a respective at least one surface of the other housing part, wherein the connection contacts are disposed on and projecting from the at least one surface, wherein the connection contacts are resilient.

17. The flowmeter of claim 16, further comprising a first return body disposed in the first housing part and a second return body disposed in the second housing part, wherein the first and second return bodies are each configured to guide the magnetic field and each includes two legs and a base, which base covers a respective coil core of the first and second coil cores at an end thereof, and wherein the legs extend laterally to the respective coil and are inclined toward the measurement tube.

18. The flowmeter of claim 17, further comprising a closure element attached to the housing and configured to connect the first return body to the second return body, wherein the closure element includes a pivotable flap or a linearly displaceable sheet metal part.

19. The flowmeter of claim 17, wherein the first and second housing parts each include an opening, wherein a corresponding leg of the first and second return bodies extends through the respective opening such that the first return body contacts the second return body in a closed state of the magnetic-inductive flowmeter.

20. The flowmeter of claim 16, wherein the measurement electrodes are disposed on opposite sides of the measurement tube, and wherein the measurement electrodes are each pin-shaped with a depression at an end thereof, which depression is configured as a receptacle for a corresponding connection contact.

21. The flowmeter of claim 16, wherein the measurement electrodes are attached in a cross-sectional plane of the measurement tube, wherein a grounding electrode configured to forming a galvanic contact with the medium is attached to the measurement tube at a distance with respect to the cross-sectional plane, and wherein another connection contact configured to electrically connect the grounding electrode to a reference potential is disposed in the first or second housing part.

22. The flowmeter of claim 16, wherein at least one of the first and second housing parts includes a front surface in which a normal of the front surface is composed of a vector parallel to a longitudinal axis of the guide element and a vector parallel to a transverse axis of the measurement tube that connects two measurement electrodes, wherein the front surface is configured as to convert a force that acts on the front surface into a linear movement of at least one of the first and second housing parts away from the respective other housing part when the measurement tube is being introduced therebetween.

23. The flowmeter of claim 16, wherein the measurement electrodes each include an L-shaped measurement electrode body.

24. The flowmeter of claim 23, wherein each measurement electrode body includes a first part and a second part, wherein an end area of the first part is configured complement a front area of the second part, and wherein the second part is connected in a positively locking manner to the first part.

25. The flowmeter of claim 16, wherein the measurement tube includes at least two guide disks configured to facilitate positioning the measurement tube within the housing in a closed state of the flowmeter, wherein the guide disks are spaced apart, wherein the guide disks each include a contact surface, wherein the guide disks are affixed to the measurement tube such that each contact surface faces the other and each contacts the housing in the closed state.

26. The flowmeter of claim 16, wherein the magnetic field-generating device is separated from the measurement tube by a wall of the housing.

27. The flowmeter of claim 26, wherein the magnetic field-generating device includes a respective pole shoe at a corresponding end of each of the first and second coil cores, wherein each pole show is separated from the measurement tube by the wall.

28. The flowmeter of claim 16, wherein the measurement tube comprises an electrically insulating material.

29. The flowmeter of claim 28, wherein the insulating material is at least one of polyether ether ketone (PEEK), polyaryl ether ketone (PAEK), polyphenylsulfone (PPSU), polyethersulfone (PESU), polysulfone (PSU), polyarylamide (PARA), glass and ceramic.

* * * * *